(12) United States Patent
Hoffmann et al.

(10) Patent No.: US 8,344,935 B1
(45) Date of Patent: Jan. 1, 2013

(54) MULTI-WAVEFORM ANTENNA AND REMOTE ELECTRONICS FOR AVIONICS

(75) Inventors: Ted J. Hoffmann, Hiawatha, IA (US); Andrew M. Vesel, Indialantic, FL (US); Roger A. Dana, Marion, IA (US); Mark A. Mulbrook, Marion, IA (US); William C. Jennings, Iowa City, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 244 days.

(21) Appl. No.: 12/841,642

(22) Filed: Jul. 22, 2010

(51) Int. Cl.
*G01S 13/00* (2006.01)
(52) U.S. Cl. .......................... 342/30; 342/52
(58) Field of Classification Search ............... 342/29–32, 342/36–40, 52, 59
See application file for complete search history.

(56) References Cited

U.S. PATENT DOCUMENTS 6,483,865 B1 * 11/2002 Beierle ......................... 375/130
6,999,022 B1 * 2/2006 Vesel et al. .................... 342/30
2008/0174472 A1 * 7/2008 Stone et al. .................. 342/30
2009/0298451 A1 * 12/2009 Malaga et al. ............... 455/129
2010/0080236 A1 * 4/2010 Shawbaki .................... 370/400

* cited by examiner

*Primary Examiner* — Timothy A Brainard
(74) *Attorney, Agent, or Firm* — Donna P. Suchy; Daniel M. Barbieri

(57) ABSTRACT

The present invention is directed to an avionics system. The avionics system may include a plurality of multi-function antennas. Each multi-function antenna includes a plurality of antenna elements and an antenna electronics system, the antenna electronics system being communicatively coupled with the plurality of antenna elements. The multi-function antennas are configured for being mounted to an exterior surface of a pressure vessel (ex—an exterior surface of an aircraft). The avionics system may further include a plurality of LRUs connected to the antennas via fiber optical cables, the LRUs being located in an interior of the aircraft. The LRUs receive communication control inputs from a communication system and establish settings of the LRUs based upon the received communication control inputs. The multi-function antennas are configured for performing operations (exs.— transmit operations, receive operations) based upon the settings established by the LRUs and based upon the communication control inputs.

19 Claims, 3 Drawing Sheets

MULTI-WAVEFORM ANTENNA AND REMOTE ELECTRONICS FOR AVIONICS

FIELD OF THE INVENTION

The present invention relates to the field of antenna technology and particularly to a multi-waveform antenna and remote electronics for avionics.

BACKGROUND OF THE INVENTION

Currently available avionics radios (ex.—Line Replaceable Units (LRUs)) implemented on aircraft are located in an avionics bay of the aircraft. Further, these currently available LRUs are connected to antennas via Radio Frequency (RF) coaxial cable. Functions are typically federated, such that each waveform (ex.—Traffic Alert and Collision Avoidance System (TCAS)) has a dedicated LRU and a dedicated antenna, said dedicated antenna being connected to the dedicated LRU via corresponding RF coax line(s). Engineers have spent considerable time and effort to reduce the weight of the individual LRUs of currently available avionics systems, said LRUs being implemented in the avionics bay of an aircraft. Further, in currently available avionics systems, substantial loss must also be overcome in the RF coax (ex.—3 decibels (dB) is typically budgeted for), meaning that twice as much power may be required to be generated at the LRU level than what is transmitted at the antenna(s). Still further, in currently available avionics systems, the LRU receive path may also be degraded.

Thus, it would be desirable to provide an avionics system which obviates the above-referenced problems associated with currently available avionics systems.

SUMMARY OF THE INVENTION

Accordingly, an embodiment of the present invention is directed to a system, including: a plurality of antennas, each antenna included in the plurality of antennas including a plurality of antenna elements and an antenna electronics system, the antenna electronics system being communicatively coupled with the plurality of antenna elements, the plurality of antennas configured for being mounted to an exterior surface of a pressure vessel; and a plurality of processing units, the plurality of processing units being communicatively coupled with the plurality of antennas, the plurality of processing units configured for being communicatively coupled to a communication system including receiving communication control inputs from the communication system, the plurality of processing units configured for establishing settings of the plurality of processing units based upon the received communication control inputs, the plurality of processing units configured for being located in an interior area of the pressure vessel, wherein the plurality of antennas are multi-function antennas configured for performing operations based upon the settings established by the processing units and based upon the communication control inputs.

A further embodiment of the present invention is directed to an avionics system, including: a plurality of multi-function antennas, each multi-function antenna included in the plurality of multi-function antennas including a plurality of antenna elements and an antenna electronics system, the antenna electronics system being communicatively coupled with the plurality of antenna elements, the plurality of multi-function antennas configured for being mounted to an exterior surface of an airframe of an aircraft; and a plurality of Line Replaceable Units (LRUs), the plurality of LRUs being communicatively coupled with the plurality of multi-function antennas via fiber optical cables, the plurality of LRUs configured for being communicatively coupled to a communication system including receiving communication control inputs from the communication system, the plurality of LRUs configured for establishing settings of the plurality of LRUs based upon the received communication control inputs, the plurality of LRUs configured for being located in an interior area of the aircraft, wherein the plurality of multi-function antennas are configured for performing operations based upon the settings established by the LRUs and based upon the communication control inputs.

A still further embodiment of the present invention is directed to a system, including: a plurality of multi-function antennas, each multi-function antenna included in the plurality of multi-function antennas including a plurality of antenna elements and an antenna electronics system, the antenna electronics system being communicatively coupled with the plurality of antenna elements, the plurality of multi-function antennas configured for being mounted to an exterior surface of a pressure vessel, the plurality of multi-function antennas configured for being communicatively coupled with a plurality of processing units via fiber optical cables, the plurality of processing units being located in an interior of the pressure vessel, the plurality of multi-function antennas being further configured for being connected to a communication system via the plurality of processing units, wherein the plurality of multi-function antennas are configured for performing at least one of: transmit operations and receive operations based upon communication control inputs provided by the communication system to the plurality of processing units.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Currently available avionics systems include a plurality of avionics radios (ex.—Line Replaceable Units (LRUs)), which are located in an interior portion (ex.—an avionics bay) of an aircraft. Further, the currently available avionics systems also include a plurality of antennas, which are located on the exterior of (ex.—mounted to an outer surface of an airframe of the aircraft). Still further, in the currently available avionics systems, the LRUs are connected to antennas via Radio Frequency (RF) coaxial cable connections.

In the currently available avionics systems, functions are typically federated. For example, each waveform (ex.—Traffic Alert and Collision Avoidance System (TCAS)) has a dedicated LRU and a dedicated antenna, said dedicated antenna being connected to the dedicated LRU via corresponding RF coax line(s). Thus, in order for the currently available avionics systems to provide a large number and variety of functions, a large number of corresponding pieces of equipment (ex.—antennas, LRUs, and RF coax lines) must be implemented. As a result, currently available avionics systems may be expensive, inefficient, and cumbersome.

Although engineers have spent considerable time and effort to reduce the size (and weight) of LRUs being implemented in the currently available avionics systems, said systems still present the above-referenced problems. For instance, in the currently available avionics systems, substantial loss must be overcome in the RF coax (ex.—3 decibels (dB) is typically budgeted for). Consequently, in the currently available avionics systems, twice as much power may be required to be generated by the LRU(s) than what is transmitted at the antenna(s). Further, in the currently available avionics systems, the LRU receive path may also be degraded.

A new approach is required to overcome the above-referenced obstacles presented by the architectures of the currently available avionics systems. Thus, the present invention described in the exemplary embodiments disclosed herein provides an avionics system which addresses the above-referenced drawbacks associated with currently available avionics systems.

Figure 1:
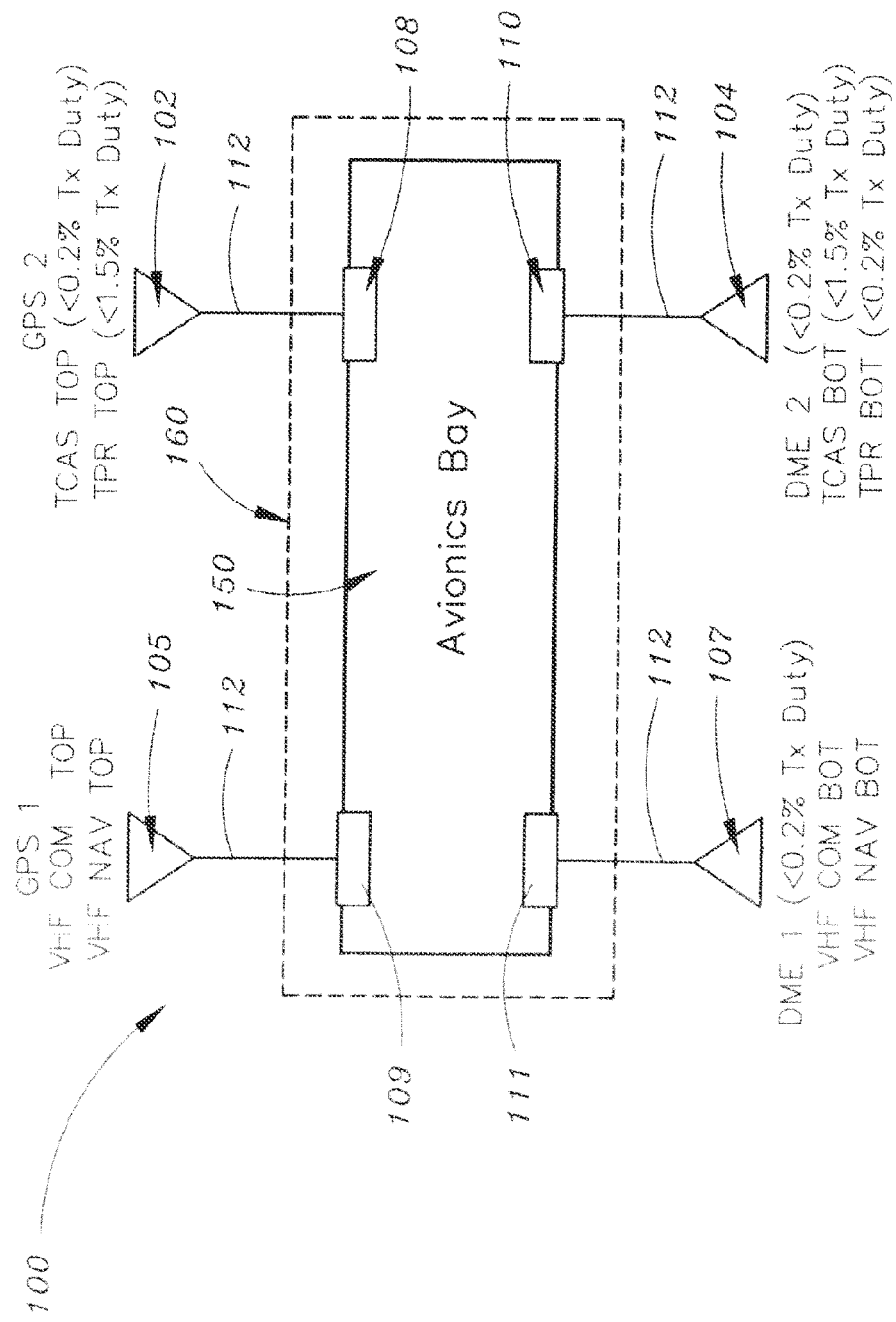
FIG. 1 is a block diagram schematic of an avionics system being implemented on-board a pressure vessel (ex.—aircraft) in accordance with an exemplary embodiment of the present invention.
Figures 2, 3:
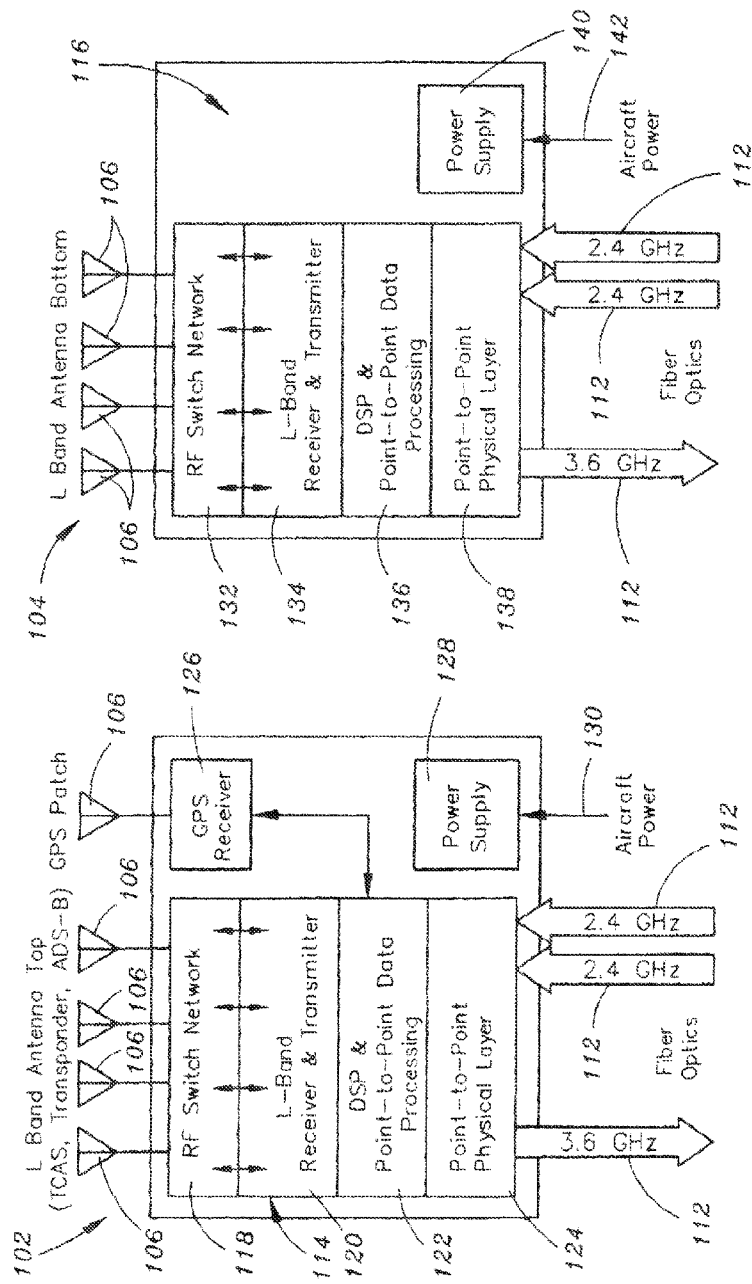
FIG. 2 is a block diagram schematic of a first multi-function antenna (ex.—including the antenna electronics system of the first multi-function antenna) of the avionics system shown in FIG. 1 in accordance with an exemplary embodiment of the present invention.
FIG. 3 is a block diagram schematic of a second multi-function antenna (ex.—including the antenna electronics system of the second multi-function antenna) of the avionics system shown in FIG. 1 in accordance with an exemplary embodiment of the present invention.

Referring generally to FIGS. 1-3, a system in accordance with an exemplary embodiment of the present invention is shown. In exemplary embodiments of the present invention, the system 100 may be an avionics system 100 which may be configured for implementation on-board an aircraft, a ship, and/or a spacecraft. In further embodiments of the present invention, the avionics system 100 may include one or more multi-function (ex.—multi-waveform) antennas (ex.—a first multi-function antenna 102, a second multi-function antenna 104, a third multi-function antenna 105 and a fourth multi-function antenna 107), the antennas (102, 104, 105, 107) each being configured for transmitting and/or receiving signals. In still further embodiments of the present invention, each of the multi-function antennas (102, 104, 105, 107) may include and may implement (ex.—may combine) a plurality of antenna elements 106, the antenna elements 106 being configured for collectively providing multiple functions. In further embodiments of the present invention, the antenna elements 106 may each be configured for operating in a same frequency band (ex.—L-band). For example, the antenna elements 106 may be Traffic Alert and Collision Avoidance System (TCAS) antenna elements, Transponder (TPR) antenna elements, Automatic Dependent Surveillance-Broadcast (ADS-B) antenna elements, Global Positioning System (GPS) antenna elements, Distance Measuring Equipment (DME) antenna elements. In still further embodiments of the present invention, other possible antenna elements 106 which may be implemented may be Very High Frequency (VHF) antenna elements (exs.—VHF NAV, VHF COM). In further embodiments, the multi-function antennas (102, 104) of the avionics system 100 of the present invention are configured for handling wider bandwidths than the antennas of currently available avionics systems. In still further embodiments, the multi-function antennas (102, 104) may be configured for directional and omni beamforming (ex.—simultaneously for receive).

Figure 4:
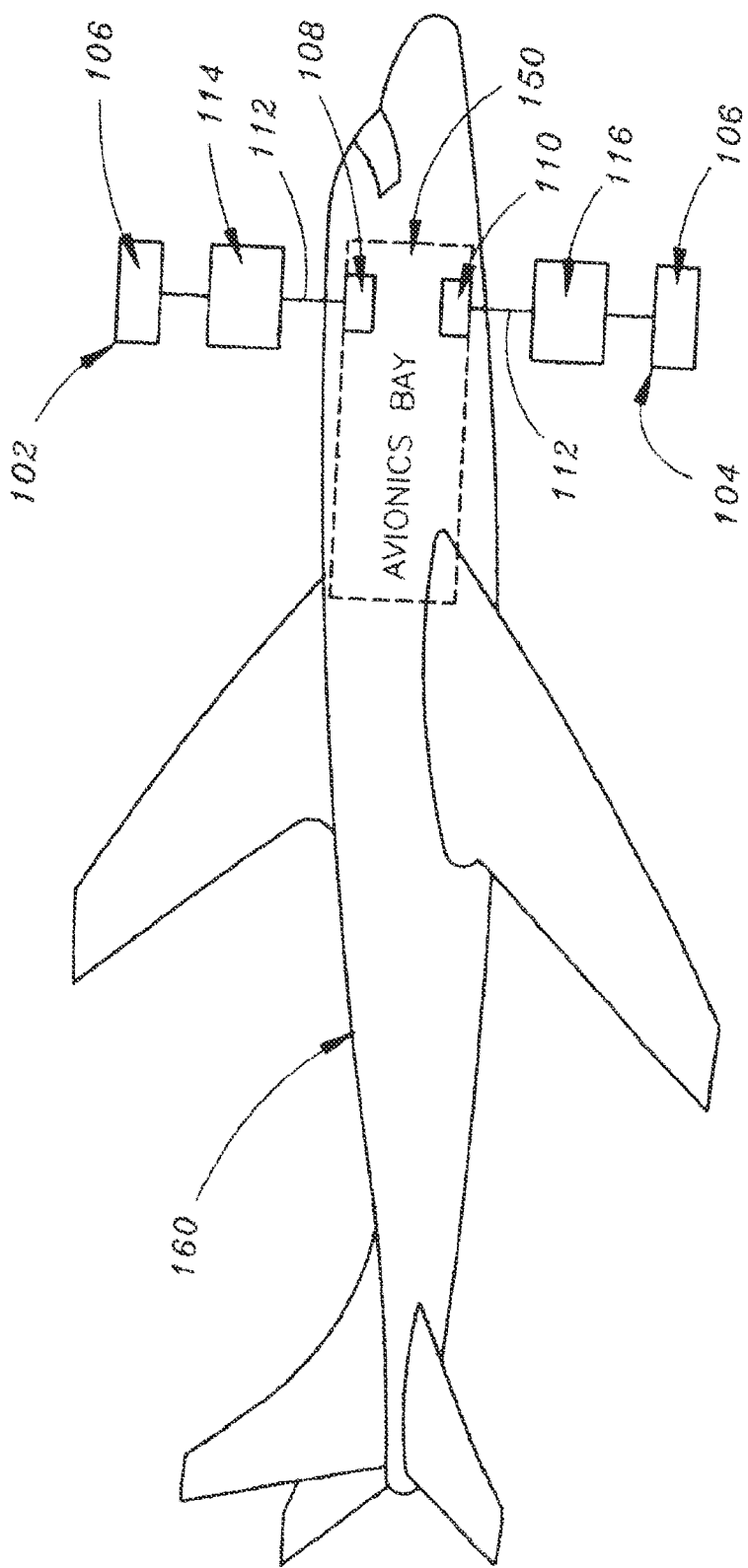
FIG. 4 is a block diagram schematic of an avionics system in accordance with an exemplary embodiment of the present invention, being implemented on-board an aircraft.

In exemplary embodiments of the present invention, the antenna elements 106 may be configured for being connected to (ex.—mounted upon) an exterior surface of a pressure vessel 160. For instance, the antenna elements 106 may be configured for being connected to (ex.—mounted upon) an exterior or outer surface of an airframe of an aircraft 160 (as shown in FIG. 4).

By implementing the multi-function antennas (102, 104, 105, 107) which combine multiple functions into a single antenna (ex.—as opposed to being just single waveform/single function antennas), the avionics system 100 of the exemplary embodiments of the present invention may be able to implement fewer antennas than currently available avionics systems when providing a similar degree and variety of functionality (ex.—same or better functionality) as said currently available avionics systems. For instance, the avionics system 100 of the present invention disclosed herein may implement as few as two antennas, such as a top antenna mounted to a top exterior surface of an airframe or fuselage of an aircraft (ex.—on a top portion or top side of an aircraft, as shown in FIG. 4) and a bottom antenna mounted to a bottom surface of an airframe or fuselage of an aircraft (ex.—on a bottom portion or bottom side of the aircraft, the bottom side being located generally opposite the top side, as shown in FIG. 4). Also, by promoting a reduction in the number of antennas which may need to be implemented compared with currently available avionics systems when providing a similar degree and variety of functionality as said currently available avionics systems, the avionics system of the exemplary embodiments of the present invention (ex.—when implemented on-board an aircraft) may be lighter weight and may promote reduced drag (ex.—wind drag) than the currently available avionics systems. Further, the avionics system 100 may provide a lower maintenance system than currently available avionics systems. For example, when implemented on an aircraft, the avionics system of the present invention, by implementing fewer antennas than currently available avionics systems, may promote a reduction in the number of ports or holes that need to be formed in the airframe of the aircraft 160 to accommodate said antennas. Thus, there may be fewer pressure seals to maintain.

In current exemplary embodiments of the present invention, the avionics system 100 may further include one or more processing units 108 (exs.—radios, Line Replaceable Units (LRUs). For example, in the embodiment illustrated in FIG. 1, the avionics system 100 may include a first LRU 108, a second LRU 110, a third LRU 109 and a fourth LRU 111. Further, the one or more LRUs (108, 109, 110, 111) may be connected to the multi-function antennas (102, 104, 105, 107). For instance, the first LRU 108 may be connected to the first multi-function antenna 102, the second LRU 110 may be connected to the second multi-function antenna 104, the third LRU 109 may be connected to the third multi-function antenna 105 and the fourth LRU 111 may be connected to the fourth multi-function antenna 107. In exemplary embodiments of the present invention, the LRUs (108, 109, 110, 111) may be modular components suitable for implementation on-board an aircraft, ship or spacecraft which are designed to be replaced quickly at an operating location. Further, the LRUs (108, 109, 110, 111) may be sealed units (ex.—black boxes), such as a radio or other auxiliary equipment.

In exemplary embodiments of the present invention, the first LRU 108, the second LRU 110, the third LRU 109 and the fourth LRU 111 may be connected to the first multi-function antenna 102, the second multi-function antenna 104, the third multi-function antenna 105, and the fourth multi-function antenna 107 respectively via communication links 112. For instance, the communication links 112 may be digital communication links provided via fiber optical cables 112 (ex.—Point-to-Point Downlink Optical Fiber, Point-to-Point Uplink Optical Fiber). In further embodiments of the present invention, the LRUs (108, 109, 110, 111) may be remotely located from the multi-function antennas (102, 104, 105, 107). For instance, the plurality of LRUs (108, 109, 110, 111) may be located in an interior area of a pressure vessel (ex.— within an avionics bay 150, located within the fuselage of an aircraft 160 (as shown in FIG. 1). Currently available avionics systems implement RF coaxial cables for connecting antennas (which are mounted on an exterior of an aircraft) with remotely-located LRUs (which are located in an avionics bay of the aircraft). The RF coaxial cables add a lot of excess weight to these currently available avionics systems, making the currently available avionics systems unduly cumbersome. In contrast, as mentioned above, the avionics system 100 of the exemplary embodiments of the present invention may utilize fiber optical cables 112 for connecting antennas (102, 104, 105, 107) to LRUs (108, 109, 110, 111). Implementation of fiber optical cables rather than RF coaxial cables may allow the avionics system 100 of the exemplary embodiments of the present invention to provide a lighter weight alternative to currently available avionics systems and may also reduce or eliminate Electromagnetic Interference (EMI) issues associated with use of RF coax cables which are experienced by the currently available avionics systems. Still further, because the avionics system 100 of the present invention may be able to implement fewer antennas than currently available avionics systems while providing similar or greater functionality than the currently available avionics systems, the avionics system 100 of the present invention may also be able to implement fewer LRUs (108, 109, 110, 111) than currently available avionics systems while providing similar of greater (expanded) functionality compared to currently available avionics system.

In current exemplary embodiments of the present invention, the avionics system 100 (ex.—the LRUs (108, 109, 110, 111) of the avionics system 100) may be configured for receiving a plurality of communication control inputs (ex.— channel inputs) from a communication system, said communication system configured for being connected (ex.—communicatively coupled) to the avionics system 100 via a plurality of communication data links. In further embodiments of the present invention, the plurality of communication control inputs may be provided from the communication system to the LRUs (108, 109, 110, 111) of the avionics system 100 via the communication data links. Further, the LRUs (108, 109, 110, 111) may establish settings (ex.— switch settings) of the LRUs (108, 109, 110, 111) based on the received communication control inputs for causing the antennas (102, 104, 105, 107) to perform operations (exs.—transmit operations, receive operations) based upon the LRU switch settings and the communication control inputs received by the avionics system 100. Further, the multi-function antennas (102, 104, 105, 107) may be able to provide multi-waveform functionality based upon said communication control inputs received by the avionics system 100. In still further embodiments of the present invention, the communication system may be remotely located from the avionics system 100. For example, the communication system may include a plurality of flight deck navigation system components, flight deck radio components, or the like located in a cockpit of the aircraft upon which the avionics system 100 is being implemented, said components being configured for providing the communication control inputs to the avionics system 100.

In exemplary embodiments of the present invention, each multi-function antenna (102, 104, 105, 107) may further include an antenna electronics system. For example, the first multi-function antenna 102 may include a first antenna electronics system 114, while the second multi-function antenna 104 may include a second antenna electronics system 116. Further, the first antenna electronics system 114 may be configured for being connected to the antenna elements 106 of the first multi-function antenna 102, while the second antenna electronics system 116 may be configured for being connected to the antenna elements 106 of the second multi-function antenna 104. In current exemplary embodiments of the present invention, the antenna electronics systems (114, 116) may be configured for supporting (ex.—facilitating) use of the fiber optical cables (112) with the antennas (102, 104) and for supporting functionality of the antennas (102, 104). In exemplary embodiments of the present invention, the antenna electronics systems (114, 116) are multi-waveform electronics systems.

Referring to FIG. 2, the antenna electronics system 114 of the first multi-function antenna 102 in accordance with an exemplary embodiment of the present invention is shown. The first antenna electronics system 114 may include a switch network 118 (ex.—an RF switch network 118), the switch network 118 being connected to the antenna elements 106 of the first multi-function antenna 102. The first antenna electronics system 114 may further include a receiver/transmitter 120 (ex.—an L-band receiver/transmitter 120), said receiver/transmitter 120 being connected to the RF switch network 118. In further embodiments of the present invention, the first antenna electronics system 114 may further include a data processing unit 122 (ex.—a Digital Signal Processing (DSP) and Point-to-Point Data Processing unit 122), said data processing unit 122 being connected to the receiver/transmitter 120. In still further embodiments of the present invention, the first antenna electronics system 114 may further include a Physical Layer 124 (ex.—a Point-to-Point Physical layer 124), the Point-to-Point Physical layer 124 being connected to the data processing unit 122, the Point-to-Point Physical layer 124 configured for being further connected to the first LRU 108 via the fiber optic cable(s) 112. In further embodiments, when one of the antenna elements 106 of the first antenna electronics system 114 includes a GPS antenna element (ex.—a GPS patch antenna element 106, as shown in FIG. 2), the first antenna electronics system 114 may further include a GPS receiver 126, the GPS receiver 126 configured for being connected to the data processing unit 122 and the GPS patch antenna element 106 included in the antenna elements 106 of the first multi-function antenna 102. In still further embodiments, the first antenna electronics system 114 may further include a power supply 128, the power supply 128 configured for being connected to a power input line 130 (ex.—of an aircraft).

Referring to FIG. 3, the antenna electronics system 116 of the second multi-function antenna 104 in accordance with an exemplary embodiment of the present invention is shown. The second antenna electronics system 116 may include a switch network 132 (ex.—an RF switch network 132), the switch network 132 being connected to the antenna elements 106 of the second multi-function antenna 104. The second antenna electronics system 116 may further include a receiver/transmitter 134 (ex.—an L-band receiver/transmitter 134), said receiver/transmitter 134 being connected to the RF switch network 132. In further embodiments of the present invention, the second antenna electronics system 116 may further include a data processing unit 136 (ex.—a Digital Signal Processing (DSP) and Point-to-Point Data Processing unit 136), said data processing unit 136 being connected to the receiver/transmitter 134. In still further embodiments of the present invention, the second antenna electronics system 116 may further include a Physical Layer 138 (ex.—a Point-to-Point Physical layer 138), the Point-to-Point Physical layer 138 being connected to the data processing unit 136, the Point-to-Point Physical layer 138 configured for being further connected to the second LRU 108 via the fiber optic cable(s) 112. In further embodiments, the second antenna electronics system 116 may further include a power supply 140, the power supply 140 configured for being connected to a power input line 142 (ex.—of an aircraft).

As part of the multi-function antennas (102, 104), the antenna electronics systems (114, 116) are co-located with the antenna elements 106 of their respective multi-function antennas (102, 104), such that the antenna electronics systems (114, 116) may be configured for being connected to (ex.—mounted upon) an exterior surface of a pressure vessel. For instance, the antenna electronics systems (114, 116) may be configured for being connected to (ex.—mounted upon) an exterior or outer surface of an airframe of an aircraft 160 as shown in FIG. 4.

In current exemplary embodiments of the present invention, the antenna electronics systems (114, 116) allow for at least some of the functionality (ex.—the RF functionality) of the avionics system 100 to be off-loaded from the LRUs (108, 110) and to be provided instead by the antenna electronics systems (114, 116), thereby allowing the LRUs (108, 110) to provide the remaining functionality of the avionics system 100 (exs.—general purpose processing, traditional input/output (I/O) functions). Further, by utilizing fiber optical cables 112 instead of RF coaxial cables, the avionics system 100 of the present invention may provide reduced loss and variation (ex.—little or no RF cable loss) compared to currently available avionics systems. Still further, the avionics system 100 of the present invention may promote reduced loss at the active electronics input by allowing the required transmit power to be nominally generated. In contrast, currently available avionics systems 100 have to generate twice as much power at the LRU level (to overcome 3 dB RF coax loss) than what is transmitted at the antennas.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A system, comprising:
a plurality of multi-function antennas, each multi-function antenna included in the plurality of multi-function antennas including a plurality of antenna elements and an antenna electronics system, the antenna electronics system being communicatively coupled with the plurality of antenna elements, the plurality of multi-function antennas configured for being mounted to an exterior surface of a pressure vessel; and
a plurality of processing units, the plurality of processing units being communicatively coupled with the plurality of multi-function antennas via fiber optical cables, the plurality of processing units configured for being communicatively coupled to a communication system including receiving communication control inputs from the communication system, the plurality of processing units configured for establishing settings of the processing units based upon the received communication control inputs, the plurality of processing units configured for being located in an interior area of the pressure vessel,
wherein the plurality of multi-function antennas are configured for performing operations based upon the settings of the processing units and based upon the communication control inputs.

2. A system as claimed in claim 1, wherein the processing units are Line Replaceable Units (LRUs).

3. A system as claimed in claim 1, wherein at least one of the antenna electronics systems includes a Radio Frequency (RF) switch network.

4. A system as claimed in claim 3, wherein the at least one antenna electronics system includes an L-band receiver and transmitter, the L-band receiver and transmitter being connected to the RF switch network.

5. A system as claimed in claim 4, wherein the at least one antenna electronics system includes a Digital Signal Processing (DSP) and Point-to-Point Data Processing unit, the DSP and Point-to-Point Data Processing unit being connected to the L-band receiver and transmitter.

6. A system as claimed in claim 5, wherein the at least one antenna electronics system includes a Point-to-Point Physical Layer, the Point-to-Point Physical Layer being connected to the DSP and Point-to-Point Data Processing unit.

7. A system as claimed in claim 1, wherein at least two of: a Traffic Alert and Collision Avoidance System (TCAS) antenna element; a Transponder (TPR) antenna element; an Automatic Dependent Surveillance-Broadcast (ADS-B) antenna element, a Global Positioning System (GPS) antenna element, a Distance Measuring Equipment (DME) antenna element, and a Very High Frequency (VHF) antenna element are antenna elements of an antenna included in the plurality of multi-function antennas.

8. A system as claimed in claim 1, wherein the pressure vessel is an aircraft.

9. A system as claim in claim 8, wherein the exterior surface of the pressure vessel is an exterior surface of an airframe of the aircraft.

10. A system as claimed in claim 9, wherein the interior area of the pressure vessel is an avionics bay of the aircraft.

11. An avionics system, comprising:
a plurality of multi-function antennas, each multi-function antenna included in the plurality of multi-function antennas including a plurality of antenna elements and an antenna electronics system, the antenna electronics system being communicatively coupled with the plurality of antenna elements, the plurality of multi-function antennas configured for being mounted to an exterior surface of an airframe of an aircraft; and
a plurality of Line Replaceable Units (LRUs), the plurality of LRUs being communicatively coupled with the plurality of multi-function antennas via fiber optical cables, the plurality of LRUs configured for being communicatively coupled to a communication system including receiving communication control inputs from the communication system, the plurality of LRUs configured for establishing settings of the plurality of LRUs based upon the received communication control inputs, the plurality of LRUs configured for being located in an interior area of the aircraft, wherein the plurality of multi-function antennas are configured for performing operations based upon the settings established by the LRUs and based upon the communication control inputs.

12. An avionics system as claimed in claim 11, wherein at least two of: a Traffic Alert and Collision Avoidance System (TCAS) antenna element; a Transponder (TPR) antenna element; an Automatic Dependent Surveillance-Broadcast (ADS-B) antenna element, a Global Positioning System (GPS) antenna element, a Distance Measuring Equipment (DME) antenna element, and a Very High Frequency (VHF) antenna element are antenna elements of a multi-function antenna included in the plurality of multi-function antennas.

13. An avionics system as claimed in claim 11, wherein at least one of the antenna electronics systems includes a Radio Frequency (RF) switch network.

14. An avionics system as claimed in claim 13, wherein the at least one antenna electronics system includes an L-band receiver and transmitter, the L-band receiver and transmitter being connected to the RF switch network.

15. An avionics system as claimed in claim 14, wherein the at least one antenna electronics system includes a Data Signal Processing (DSP) and Point-to-Point Data Processing unit, the DSP and Point-to-Point Data Processing unit being connected to the L-band receiver and transmitter.

16. An avionics system as claimed in claim 15, wherein the at least one antenna electronics system includes a Point-to-Point Physical Layer, the Point-to-Point Physical Layer being connected to the DSP and Point-to-Point Data Processing unit.

17. A system, comprising:
a plurality of multi-function antennas, each multi-function antenna included in the plurality of multi-function antennas including a plurality of antenna elements and an antenna electronics system, the antenna electronics system being communicatively coupled with the plurality of antenna elements, the plurality of multi-function antennas configured for being mounted to an exterior surface of a pressure vessel, the plurality of multi-function antennas configured for being communicatively coupled with a plurality of processing units via fiber optical cables, the plurality of processing units being located in an interior of the pressure vessel, the plurality of multi-function antennas being further configured for being connected to a communication system via the plurality of processing units, wherein the plurality of multi-function antennas are configured for performing at least one of: transmit operations and receive operations based upon communication control inputs provided by the communication system to the plurality of processing units.

18. A system as claimed in claim 17, wherein at least one of the antenna electronics systems includes:
a Radio Frequency (RF) switch network;
an L-band receiver and transmitter, the L-band receiver and transmitter being connected to the RF switch network;
a Data Signal Processing (DSP) and Point-to-Point Data Processing unit, the DSP and Point-to-Point Data Processing unit being connected to the L-band receiver and transmitter; and
a Point-to-Point Physical Layer, the Point-to-Point Physical Layer being connected to the DSP and Point-to-Point Data Processing unit.

19. A system as claimed in claim 17, wherein at least two of: a Traffic Alert and Collision Avoidance System (TCAS) antenna element; a Transponder (TPR) antenna element; an Automatic Dependent Surveillance-Broadcast (ADS-B) antenna element, a Global Positioning System (GPS) antenna element, a Distance Measuring Equipment (DME) antenna element, and a Very High Frequency (VHF) antenna element are antenna elements of a multi-function antenna included in the plurality of multi-function antennas.

* * * * *